United States Patent
Watanabe et al.

(10) Patent No.: US 6,851,181 B2
(45) Date of Patent: Feb. 8, 2005

(54) APPARATUS FOR MANUFACTURING NON-RESONANCE KNOCK SENSOR

(75) Inventors: Yusuke Watanabe, Obu (JP); Shigeru Ohwaki, Kuwana (JP); Takashi Yamauchi, Nagoya (JP); Katsushi Iwata, Yokkaichi (JP)

(73) Assignee: Denso Corporation (JP)

( * ) Notice: Subject to any disclaimer, the term of this patent is extended or adjusted under 35 U.S.C. 154(b) by 63 days.

(21) Appl. No.: 10/214,460

(22) Filed: Aug. 8, 2002

(65) Prior Publication Data

US 2003/0029028 A1 Feb. 13, 2003

(30) Foreign Application Priority Data

Aug. 9, 2001 (JP) ........................................ 2001-242781

(51) Int. Cl.⁷ ........................... B23P 19/00; H04R 17/00
(52) U.S. Cl. .............................. 29/742; 29/739; 29/729; 29/783; 29/793; 29/430; 29/593; 29/25.35
(58) Field of Search ..................... 29/742, 743, 740, 29/729, 783–786, 610.1, 25.35, 793, 430; 310/321–329; 219/388; 228/9, 12, 43; 198/689.1, 687.1, 687.03, 346.1; 414/737

(56) References Cited

U.S. PATENT DOCUMENTS

| | | | | |
|---|---|---|---|---|
| 4,014,428 A | * | 3/1977 | Ossbahr .................. | 198/345.3 |
| 5,125,149 A | * | 6/1992 | Inaba et al. .................... | 29/430 |
| 5,237,736 A | * | 8/1993 | Inoue et al. ................... | 29/563 |
| 5,575,053 A | * | 11/1996 | Ishida et al. .................. | 29/430 |
| 5,727,301 A | * | 3/1998 | Kugo ........................... | 29/430 |
| 2003/0029028 A1 | * | 2/2003 | Watanabe et al. ............. | 29/742 |

FOREIGN PATENT DOCUMENTS

| | | | |
|---|---|---|---|
| JP | 7-218331 | * | 8/1995 |
| JP | 8-155761 | * | 6/1996 |
| JP | 2003/57107 | * | 2/2003 |

* cited by examiner

*Primary Examiner*—Minh Trinh
(74) *Attorney, Agent, or Firm*—Nixon & Vanderhye PC

(57) ABSTRACT

An apparatus of two stories for manufacturing a non-resonance knock sensor has an assembly body stage positioned at a first floor for forming an assembly body in which a lower insulator, a lower terminal plate, a piezoelectric element, an upper terminal plate and an upper insulator are mounted on a cylindrical base, and process stages positioned at a second floor for fastening the assembly body with a nut to form a sensor main body, bending partly the lower and upper terminal plates of the sensor main body and connecting by welding a resistor between the lower and upper terminal plates which are partly bent in the sensor main body. Accordingly, its manufacturing line is compact and can be installed in smaller horizontal ground area.

7 Claims, 15 Drawing Sheets

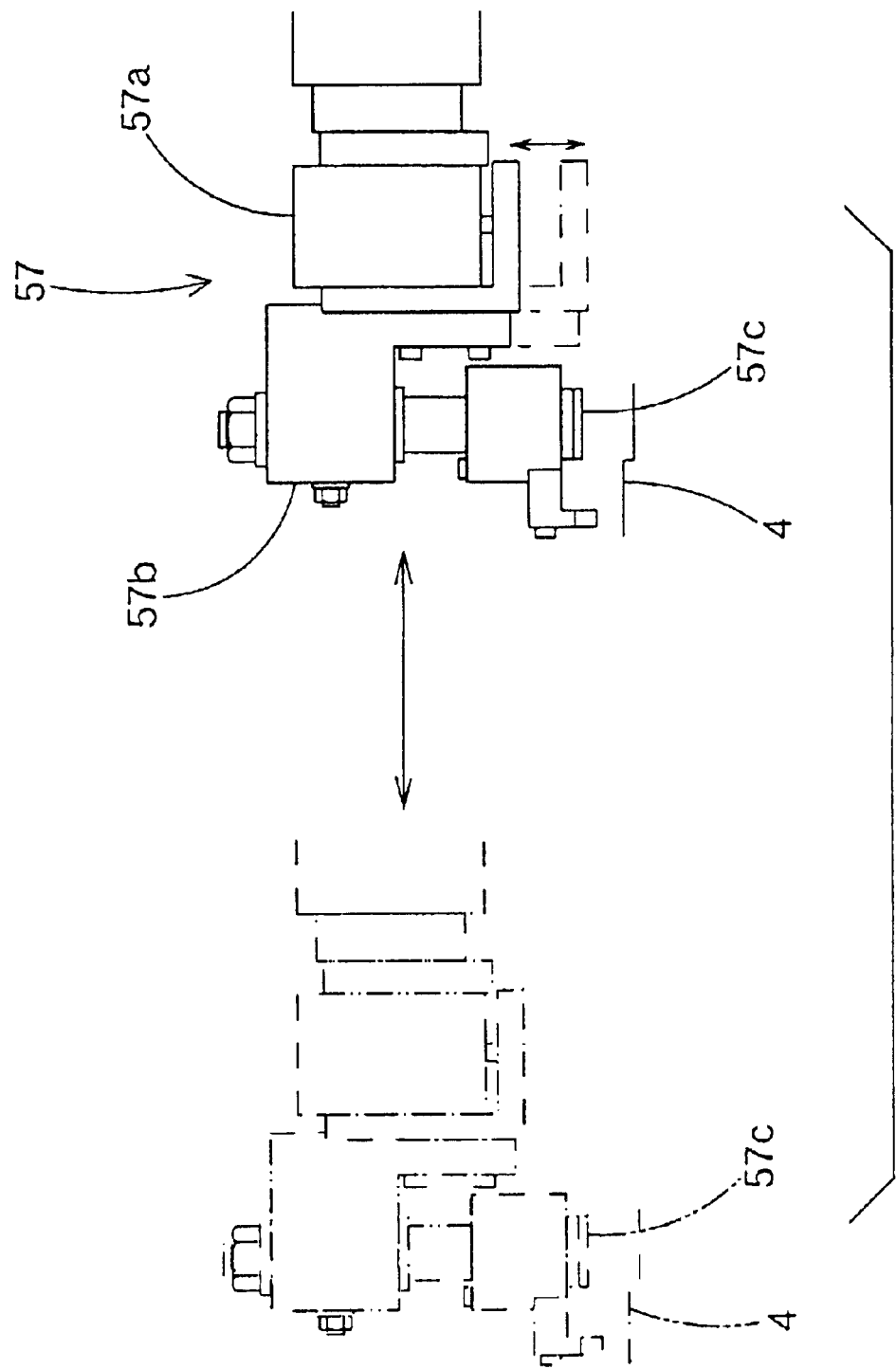

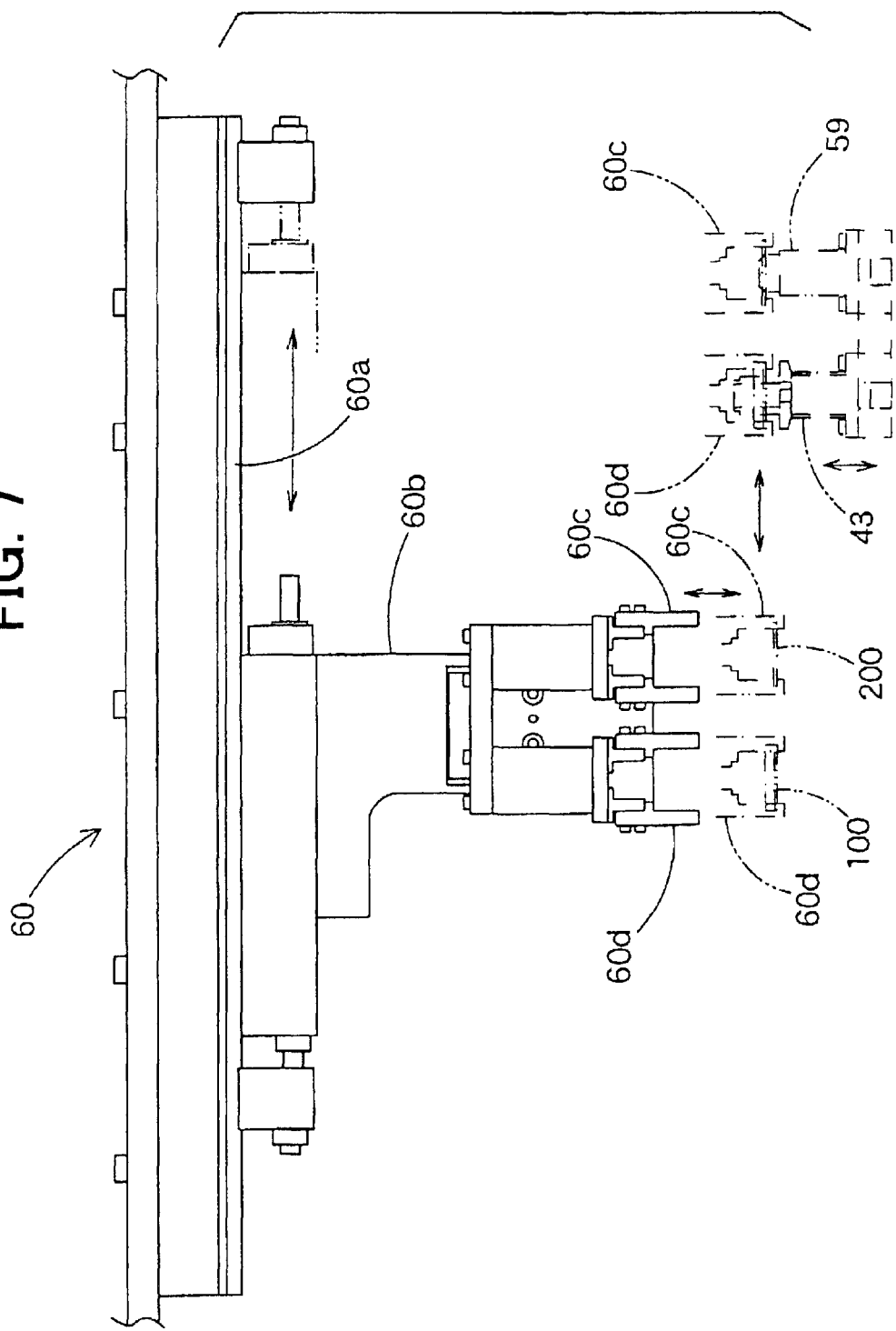

APPARATUS FOR MANUFACTURING NON-RESONANCE KNOCK SENSOR

CROSS REFERENCE TO RELATED APPLICATION

This application is based upon and claims the benefit of priority of Japanese Patent Application No. 2001-242781 filed on Aug. 9, 2001, the content of which is incorporated herein by reference.

BACKGROUND OF THE INVENTION

1. Field of the Invention

The present invention relates to a method of manufacturing a non-resonance knock sensor and an apparatus of manufacturing the same.

2. Description of Related Art

JP-A-2000-249598 discloses a non-resonance knock sensor. The non-resonance knock sensor is composed of various components, as shown in FIGS. 12, 13 and 14. FIG. 12 is a sectional view of a assembly body of a non-resonance knock sensor before resin mold process. FIG. 13 is a sectional view of a sensor main body of the non-resonance knock sensor after the resin mold process. FIG. 14 is an exploded perspective view of the assembly body of FIG. 12.

As shown in FIGS. 12 to 14, a cylindrical base 1 made of metal such as iron is integrally provided at a lower end thereof with a flange 1a. The cylindrical base 1 is provided around an outer circumference at an upper end thereof and around an outer circumference of the flange 1a with a piece or plurality pieces of annular grooves 1b, respectively, for assuring sealing characteristic with mold resin. The cylindrical base is further provided around an outer circumference thereof below the annular grooves 1b on an upper end side with a male thread to which a nut 2 is fastened.

A ring shaped insulator 3A, a ring shaped terminal plate 4A, a ring shaped piezoelectric element 5, a ring shaped terminal plate 4B and a ring shaped insulator 3B are inserted to the cylindrical base 1 in order so as to be piled on top of one another. Electrodes of the piezoelectric element 5 at upper and lower faces thereof are in contact respectively with the terminal plates 4A and 4B. The terminal plates 4A and 4B are provided respectively with terminals 5a extending in the same direction. A resistor is connected between the terminals 4a.

As shown in FIGS. 12 to 14, the nut 2 is composed of an upper end cylindrical portion whose inner circumference has a female thread, a lower end ring shaped weight 2b and a thin thickness cylindrical portion 2a bridging between the upper end cylindrical portion and the ring shaped weight 2b. The thin thickness cylindrical portion 2a is formed in shape of a taper whose diameter is larger toward the ring shaped weight 2b. An inner diameter of the ring shaped weight 2b is larger than an outer diameter of the upper end cylindrical portion. Wall thickness of the thin thickness cylindrical portion 2a is below 2 mm or thinner than that of the ring shaped weight 2b for securing its resiliency. The insulators 3A and 3B, the terminal plates 4A and 4B and the piezoelectric element 5 are sandwiched and pressed between the ring shaped weight 2b and the flange 1a and covered with mold resin 7.

Inner and outer diameters of the ring shaped weight 2b are substantially same to those of the insulators 3A and 3B, the terminal plates 4A and 4B and the piezoelectric element 5. A preset load is applied axially from an entire lower end surface of the ring shaped weight 2b to an entire surface of the piezoelectric element 5. The ring shaped weight 2b is provided at a plurality of portions, typically at two portions, on an upper side outer circumference thereof with cuts 2c, to which a fastening tool is fitted for fastening the nut 2.

As shown in FIG. 15 as a general idea, an automatic assembly line for manufacturing the non-resonance knock sensor mentioned above has an assembling stage 10 where the insulator 3A, the terminal plate 4A, the piezoelectric element 5, the terminal plate 4B, the insulator 3B are inserted piece by piece sequentially to the cylindrical base 1, a fastening stage 11 where the components piled up on top of one another at the assembling stage are fastened with the nut 2 and fixed to one another, a bending stage 12 where the terminals 4a of the terminal plates 4A and 4B are bent, and a welding stage 13 where the resistor 6 is connected by welding between the terminals 4a. The assembling stage 10, the fastening stage 11, the bending stage 12 and the welding stage 13 are arranged in straight. The automatic assembly line further has a resin molding stage 14 adjacent to the welding stage 13, an anneal furnace 15 positioned on the back of the resin molding stage 14 and a series of a leak check stage 16, an insulation check stage and a performance check stage.

A horizontal floor area necessary for installing the automatic assembly line mentioned above is about 98 m² as a calculation, in spite of a relatively small body of the non-resonance knock sensor whose size is about 3 cm×6 cm.

SUMMARY OF THE INVENTION

An object of the present invention is to provide an apparatus of two stories of manufacturing a non-resonance knock sensor, whose structure is compact with smaller horizontal ground area for installation.

It is another object of the present invention to provide a method of manufacturing the non-resonance knock sensor whose processes are simpler.

To achieve the objects mentioned above, the apparatus has an assembly body stage positioned at a first floor for forming an assembly body in which a lower insulator, a lower terminal plate, a piezoelectric element, an upper terminal plate and an upper insulator are mounted on a cylindrical base, process stages positioned at a second floor for fastening the assembly body with a nut to form a sensor main body, bending partly the lower and upper terminal plates of the sensor main body and connecting by welding a resistor between the lower and upper terminal plates which are partly bent in the sensor main body, and an elevator equipment for transferring the assembly body from the first floor to the second floor.

Since the assembly body stage, to which many components have to be supplied for assembly so that relatively larger horizontal ground area is necessary for its installation, is located at the fist floor and the process stages are located at the second floor, a manufacturing line in use of the apparatus mentioned above is compact.

It is preferable that the assembly body stage comprises a first laminate forming device of assembling a first laminate in which the lower insulator, the lower terminal plate and the piezoelectric element are sequentially piled up on top of one another, a second laminate forming device of assembling a second laminate in which the upper insulator and the upper terminal plate are sequentially piled up, a first assembly device of mounting the first laminate on the cylindrical base, and a second assembly of mounting the second laminate on upside down on the first laminate mounted on the cylindrical base to form the assembly body.

Since the assembly body is formed by assembling, as a final process, the first and second laminates which are separately assembled as auxiliary processes, a time from assembling start to assembly end for the assembly process mentioned above is shorter, compared with that for the conventional assembling process in which components are assembled one by one.

It is more preferable that the first and second assembly devices have an assembly turn table commonly usable therefor on which the cylindrical base is mounted. According to this manufacturing line, the plural kinds of components to be assembled are supplied from a plurality of positions around and outside the turn table toward a center of the turn table so that the horizontal ground area necessary for forming the assembly body is smaller, compared with that of the conventional manufacturing line arranged in straight for assembling the components one by one.

Further, preferably, the process have respective turn tables for fastening the nut to the assembly body, bending partly the lower and upper terminal plates and connecting by welding the resistor between the lower and upper terminal plates which are partly bent. Since operations necessary for respective fastening, bending and welding stages are cyclically executed, a horizontal area necessary for these processes is limited, compared with the conventional operations arranged in straight. Moreover, since theses operations can be executed in parallel to but with close relationship with one another, the manufacturing line thereof is very effective.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 6 is an elevation view of a part of a terminal plate loading device;

FIG. 7 is an elevation view of a first and second laminates loading device;

DETAILED DESCRIPTION OF THE PREFERRED EMBODIMENTS

A preferred embodiment of the present invention are described with reference to figures attached hereto.

First Embodiment

Figure 1:
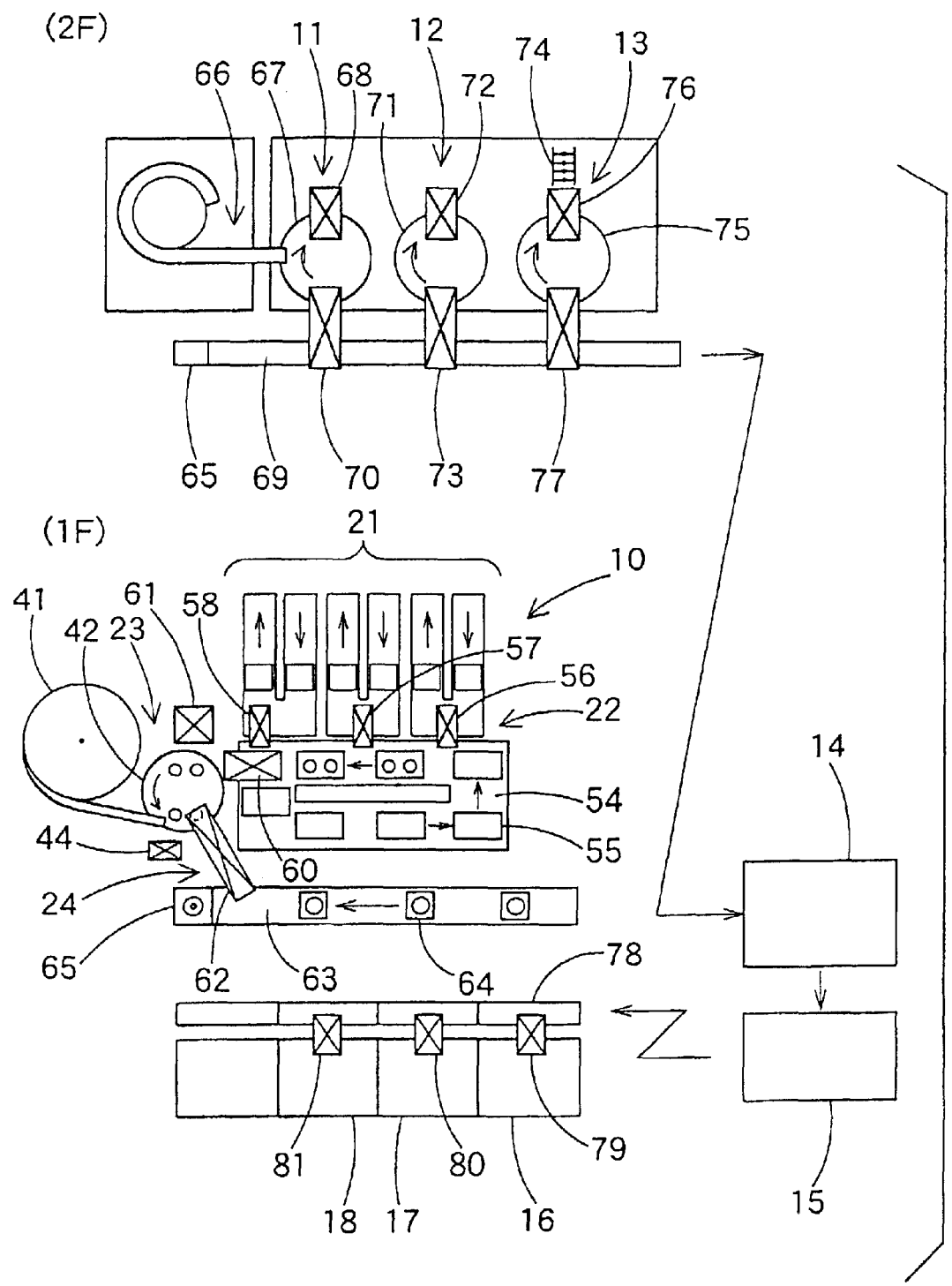
FIG. 1 is a view showing an outline of a manufacturing line for executing a method of manufacturing a non-resonance knock sensor according to an embodiment of the present invention.
Figure 2:
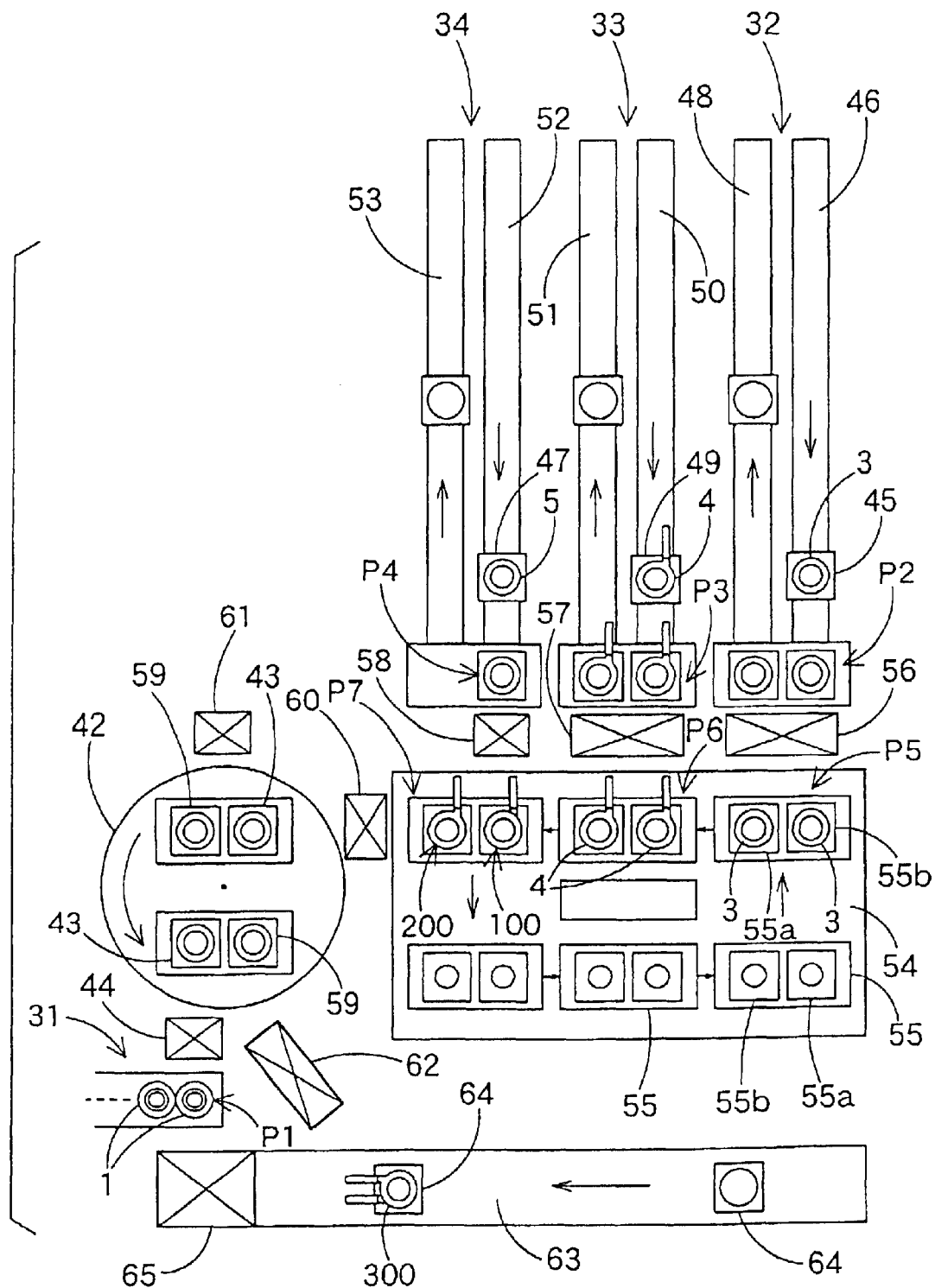
FIG. 2 is an enlarged view of a part (assembly stage) of the manufacturing line of FIG. 1.

FIG. 1 shows an outline of a manufacturing line for executing a method of manufacturing a non-resonance knock sensor. FIG. 2 shows an outline of an assembling stage.

As shown in FIG. 1, the manufacturing line has a two-story apparatus. An assembly stage 10, resin molding stage 14, an anneal furnace 15, a leak check stage 16, an insulation check stage 17 and a performance check stage 18 are arranged at first floor. A fastening stage 11, a bending stage 12 and a welding stage 13 are arranged at second floor positioned above the assembling stage 10.

The assembling stage 10 is composed of a part supply section 21 to which a cylindrical base 1, an insulator 3, a terminal plate 4 and an piezoelectric element 5 are supplied, a laminate formation section 22 for forming a first laminate 100 composed of a lower side insulator 3A, a lower side terminal plate 4A and the piezoelectric element 5 which are piled up sequentially on top of one another and a second laminate 200 composed of an upper side insulator 3B and an upper side terminal plate 4B piled up on the insulator 3B, an assembly body formation section 23 for forming a assembly body 300 by inserting the first laminate 100 into the cylindrical base 1 and, after turning over the second laminate 200, inserting the second laminate 200 into the cylindrical base 1, and a assembly body take-out section 24 for taking the assembly body 300 out.

The part supply section 21 is composed of a cylindrical base supply portion 31, an insulator supply portion 32, a terminal plate supply portion and a piezoelectric element supply portion 34.

In the cylindrical base supply portion 31, the cylindrical bases 1 are supplied from a cylindrical base supply unit 41, while being rearranged to form a line, until a top one of the cylindrical bases 1 in a line reaches a loading position P1 and, as soon as the top of the cylindrical bases 1 waiting at the loading position P1 is transferred to an assembly die 43 on a turn table 42 for assembly, a next one of the cylindrical bases 1 adjacent to the top one thereof is supplied to and waits at the loading position P1. A transfer operation to the turn table 42 for assembly is carried out by a cylindrical base transfer device 44 in such a manner that the cylindrical base 1 at the loading position P1 is picked up and, while being held, transferred in a straight line to the assembly die 43 for loading. The cylindrical base transfer device is a so called pick and press type loader.

In the insulator supply portion 32, two insulator magazines 45 each accommodating a plenty of the insulators 3 are transferred through a supply belt 46 to a loading position P2. In the insulator magazine 45, whose construction is similar to that of a piezoelectric element magazine 47 to be described later in FIGS. 3A and 3B, the plenty of the insulators 3 are orientated horizontally and piled up on top of one another vertically inside a vertically straight cylinder 47a. A bottom plate 47b of the cylinder 47a is movable up and down according to values of air pressure of an air chamber 47c so that height position of the most above end insulator 3 is adjusted always to a predetermined height level by controlling the values of air pressure of the air pressure chamber 47c. The insulator magazine 45 that has been brought empty through a laminate formation work to be described later is taken out via a take-out belt 38 to outside.

In the terminal plate supply portion, similarly as the insulator supply portion 32, two terminal plate magazines 49 each of which accommodates a plenty of the terminal plates 4 are transferred through a supply belt 50 to a loading position P3. In the terminal plate magazine 47, whose construction is similar to that of a piezoelectric element magazine 47, the plenty of the terminal plates 4 are orientated horizontally and piled up on top of one another vertically inside a vertically inclined, not straight, cylinder. A bottom plate of this cylinder is movable up and down according to values of air pressure of an air chamber so that height position of the most above end terminal plate 4 is adjusted always to a predetermined height level by controlling the values of air pressure of the air pressure chamber. The inclined cylinder is used because, when the terminal plates 4 are orientated horizontally and piled up on top of one another vertically, center axes of the terminal plates 4 are gradually offset horizontally, since the terminal 4a of the terminal plate 4 extends radially outward from a ring shaped electrode portion with a bending portion on its way. The terminal plate magazine 49 that has been brought empty through a laminate formation work to be described later is taken out via a take-out belt 51 to outside.

Figure 3A:
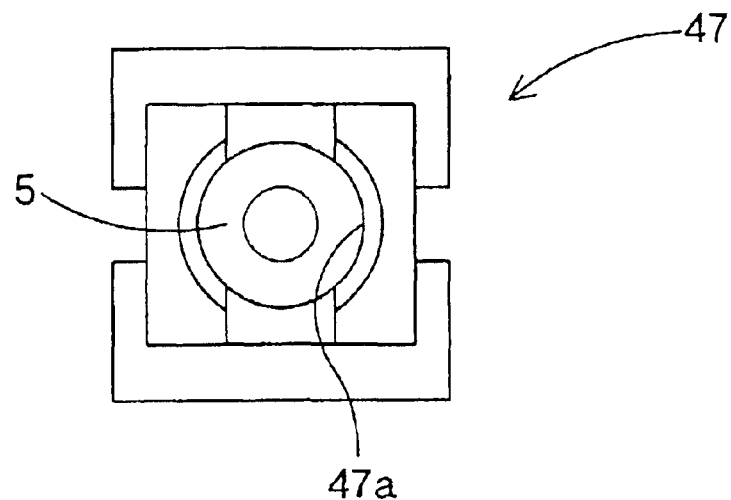
FIG. 3A is a plane view of a piezoelectric magazine.
Figure 3B:
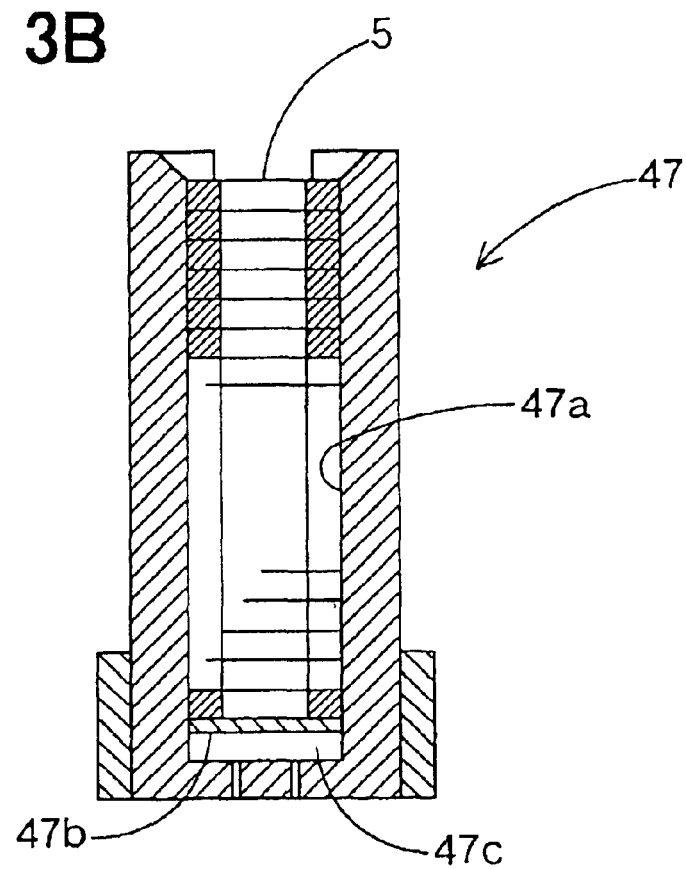
FIG. 3B is an elevation sectional view of the piezoelectric magazine of FIG. 3A.

In the piezoelectric element supply portion 34, a piezoelectric element magazine 47 accommodating a plenty of the piezoelectric element 5 is transferred through a supply belt 52 to a loading position P4. In the piezoelectric element magazine 47, as shown in FIGS. 3A and 3B, the plenty of the piezoelectric elements 5 are orientated horizontally and piled up on top of one another vertically inside a vertically straight cylinder 47a. A bottom plate 47b of the cylinder 47a is movable up and down according to values of air pressure of an air chamber 47c so that height position of the most above end piezoelectric element 5 is adjusted always to a predetermined height level by controlling the values of air pressure of the air pressure chamber 47c. The piezoelectric element magazine 47 that has been brought empty through a laminate formation work to be described later is taken out via a take-out belt 53 to outside.

Figure 4:
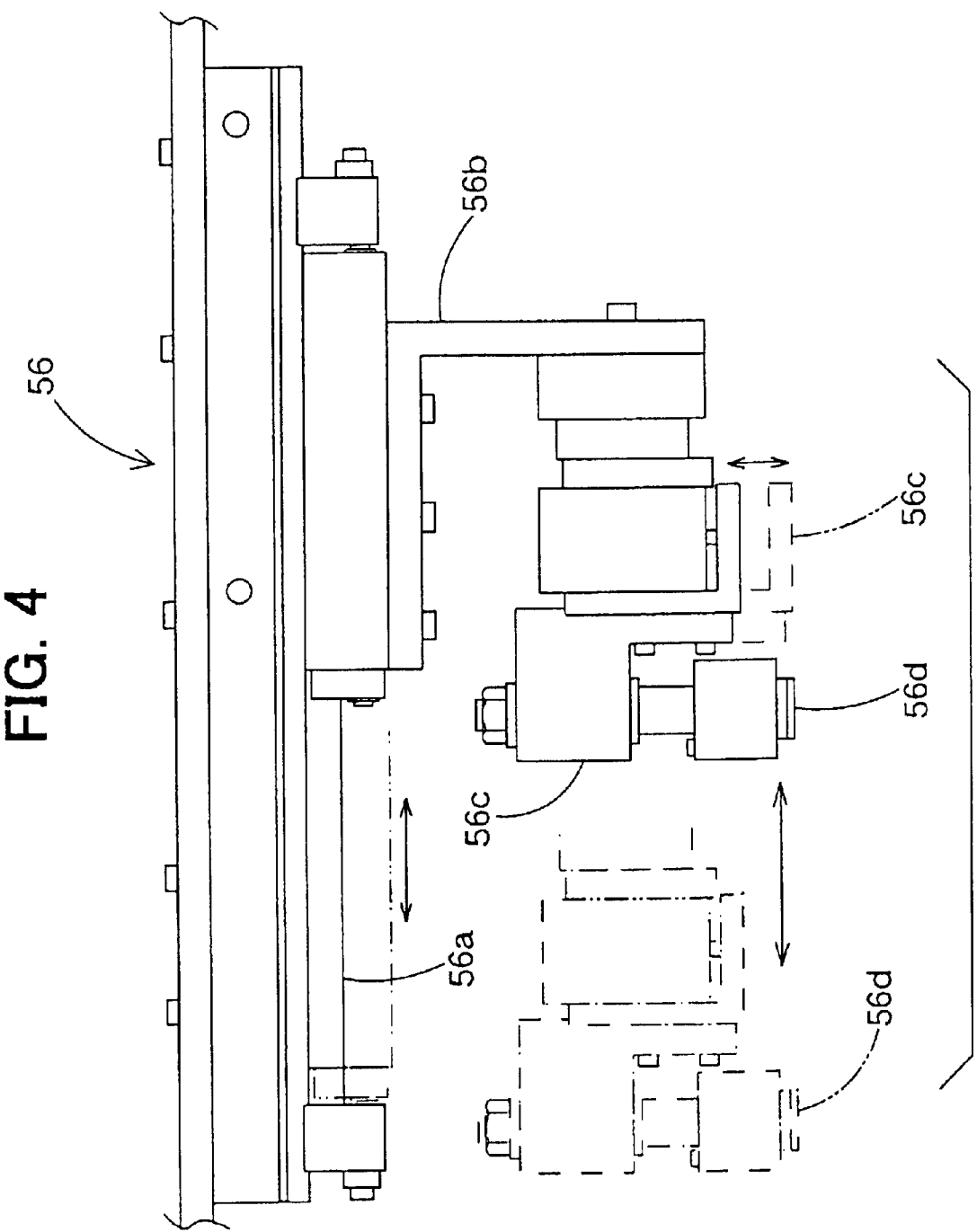
FIG. 4 is an elevation view of an insulator loading device.
Figure 5:
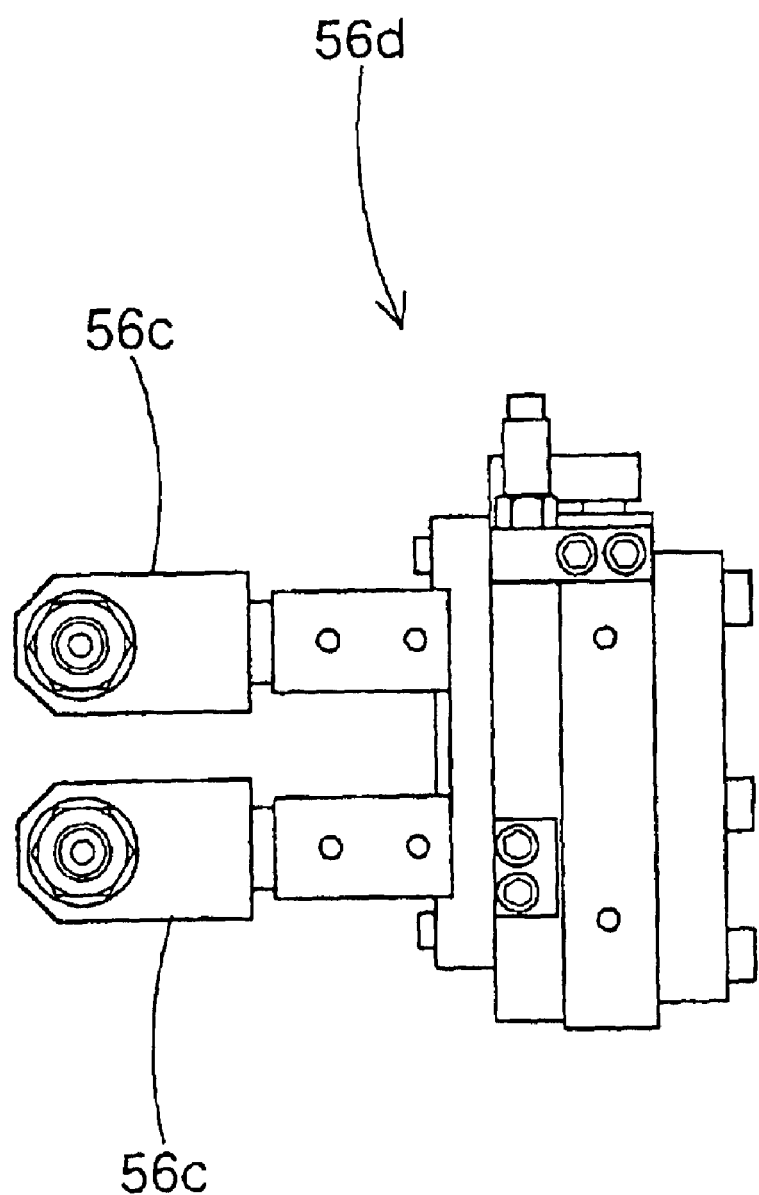
FIG. 5 is a plane view of a part of the insulator loading device of FIG. 4.

In the laminate formation portion 22, a circulation belt 54, on which a plurality of pallets 55 are installed, is driven to move forward and rest at predetermined time intervals. Each of the pallet 55 has a front side die 55a and a back side die 55b which are arranged in a forward direction of the circulation belt 54. When the pallet 55 rests at a loading position P5 corresponding to the loading position P2 of the insulator supply portion 32, an insulator loading device 56 is operative to transfer 2 pieces of the insulators 3 from the two insulator magazines 45 so as to put on the two dies 55a and 55b, respectively. The insulator loading device 56, as shown in FIGS. 4 and 5, is provided with an arm 56b movable in straight forward and backward along a guide rail 56a fixed thereto and two hands 56c movable in straight upward and downward on the arm 56b. A front end 56d of each of the hands 56c is provided with a vacuum unit so that the front end 56d sticks to a circular upper surface of the insulator 3. An operation of transferring the insulators 3 from the insulator magazines 45 to the dies 55a and 55b on the pallet 55 is performed in such a manner that the arm 56b moves forward to position the hands 56c right above the insulator magazines 45 at first, then, the hands 56c move downward and stick with vacuum to the most upper end insulators accommodated in the insulator magazines 45, further then, after the hands 56c move upward, the arm 56b moves backward to position the hands 56c right above the dies 55a and 55b of the pallet 55, and, after the hands 56c move downward again and the insulators 3 are mounted on the dies 55a and 55b, the hands 56c move upward.

The pallet 55 on which the insulators 3 are mounted moves to a position P6 corresponding to the loading position P3 of the terminal plate supply portion 33 and rests at the position P6. At the position P6, a terminal plate loading device 57 is operative to transfer 2 pieces of the terminal plates 4 from the two terminal plate magazines 49 so as to put on the two insulators 3 already mounted on the two dies 55a and 55b, respectively. The terminal plate loading device 57 whose construction is substantially similar to that of the insulator loading device 56 as shown in FIG. 6. The terminal plate loading device 56 is provided with an arm 57a movable in straight forward and backward along a guide rail (not shown) fixed thereto and two hands 57b movable in straight upward and downward on the arm 57a. A front end 57c of each of the hands 57a is provided with a vacuum unit so that the front end 57c sticks to a circular electrode portion of the terminal plate 4. An operation of transferring the terminal plates 4 from the terminal plate magazines 49 to the dies 55a and 55b on the pallet 55 is performed, similarly as that of the insulators 3 in such a manner that the arm 57a moves forward to position the hands 57b right above the terminal plate magazines 49 at first, then, the hands 57b move downward and stick with vacuum to the most upper end terminal plates 4 accommodated in the terminal plate magazines 49, further then, after the hands 57b move upward, the arm 57a moves backward to position the hands 57b right above the dies 55a and 55b of the pallet 55, and, after the hands 57b move downward again and the terminal plates 4 are mounted on the dies 55a and 55b, the hands 57b moves upward.

As mentioned above, the terminal plate 4 is put on the insulator 3 in each of the front and back side dies 55a and 55b. The terminal plate 4 and the insulator 3 mounted on the front side die 55a is upper side terminal plate 4B and insulator 3B and the terminal plate 4 and the insulator 3 mounted on the back side die 55b is lower side terminal plate 4A and insulator 4B, when they are assembled to the cylindrical base 1, respectively.

Then, the pallet 55 on which the insulators 3 and the terminals 4 are mounted moves to a position P7 corresponding to the loading position P4 of piezoelectric element supply portion 34 and rests at the position P7. At the position P7, a piezoelectric element loading device 58 is operative to transfer one piece of the piezoelectric element 5 from the piezoelectric element magazine 47 so as to put on the terminal plate 4 already mounted on the back side die 55b. The piezoelectric element loading device 58 whose construction is substantially similar to that of the insulator loading device 56. The piezoelectric element loading device 58, which is not shown in detail, is provided with an arm movable in straight forward and backward along a guide rail fixed thereto and a hand movable in straight upward and downward on the arm. A front end of the hand is provided with a vacuum unit so that the front end sticks to an upper surface of the piezoelectric element 5. An operation of transferring the piezoelectric element 5 from the piezoelectric element magazine 47 to the back side die 55b on the pallet 55 is performed, similarly as that of the insulators 3 in such a manner that the arm moves forward to position the hand right above the piezoelectric element magazines 47 at first, then, the hand moves downward and sticks with vacuum to the most upper end piezoelectric element 5 accommodated in the piezoelectric element magazines 47, further then, after the hand moves upward, the arm moves backward so as to position the hand right above the back side die 55b of the pallet 55, and, after the hand moves downward again and the piezoelectric element 5 is mounted on the die 55b, the hand moves upward.

As mentioned above, in the laminate formation section 22, a first laminate 100 composed of the lower insulator 3A, the lower terminal plate 4A and the piezoelectric element 5 which are piled up on top of one another is formed on the back side die 55b of the pallet 55 and a second laminate 200 composed of the upper insulator 3b and the upper terminal plate 4B which are stacked with each other is formed on the front side die 55a of the pallet 55.

The assembly formation section 23 is provided with the turntable 42 for assembling. The turn table 42 has, in addition to the die 43 mentioned above, an auxiliary die 59 on which the second laminate 200 is mounted, as described later. In the assembly formation section 23, the turn table 42 is rotates by 180° after the cylindrical base 1 is mounted on the die 43 through the cylindrical base supply portion 31 so that the die 43 and the auxiliary die 59 are positioned near the pallet 55 on which the first and second laminates 100 and 200 are mounted. A first and second laminate loading device 60 is operative to transfer the first laminate 100 and the second laminate 200 on the pallet 50 to the dies 43 and the auxiliary die 59, respectively. The first and second laminate loading device 60, as shown in FIG. 7, is provided with an arm 60b movable in straight forward and backward along a guide rail 60a fixed thereto and front and back side hands 60c and 60d movable in straight upward and downward on the arm 60b. The front side hand 60c is constructed to hold the second laminate 200 and the back side hand 60d to hold the first laminate 100. An operation of transferring the first and second laminates 100 and 200 from the pallet 55 to the dies 43 and 59, respectively, is performed in such a manner that the arm 60b moves forward to position the hands 60c and 60d right above the pallet 55 at first, then, the hands 60c and 60d move downward and hold the first and second laminates 100 and 200 on the pallet 55, further then, after the hands 60c and 60d move upward, the arm 60b moves backward to position the hands 60c and 60d right above the dies 43 and 49 corresponding thereto, respectively, and, after the hands 60c and 60d move downward again and, once the first and second laminates 100 and 200 mounted on the dies 43 and 59, release the holding of the first and second laminates 100 and 200, the hands 60c and 60d move upward.

Accordingly, the first laminate 100 is put on the cylindrical base 1 in the die 43 and the second laminate 200 is put on the auxiliary die 59.

Figure 8A:
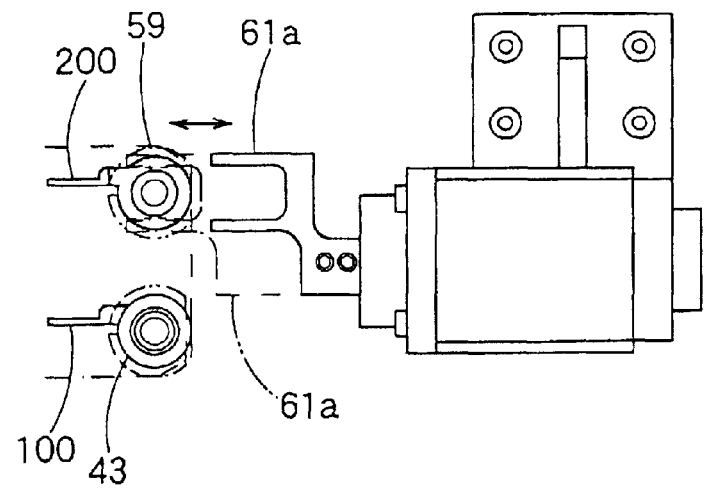
FIG. 8A is a plane view of a second laminate turn over loading device.
Figure 8B:
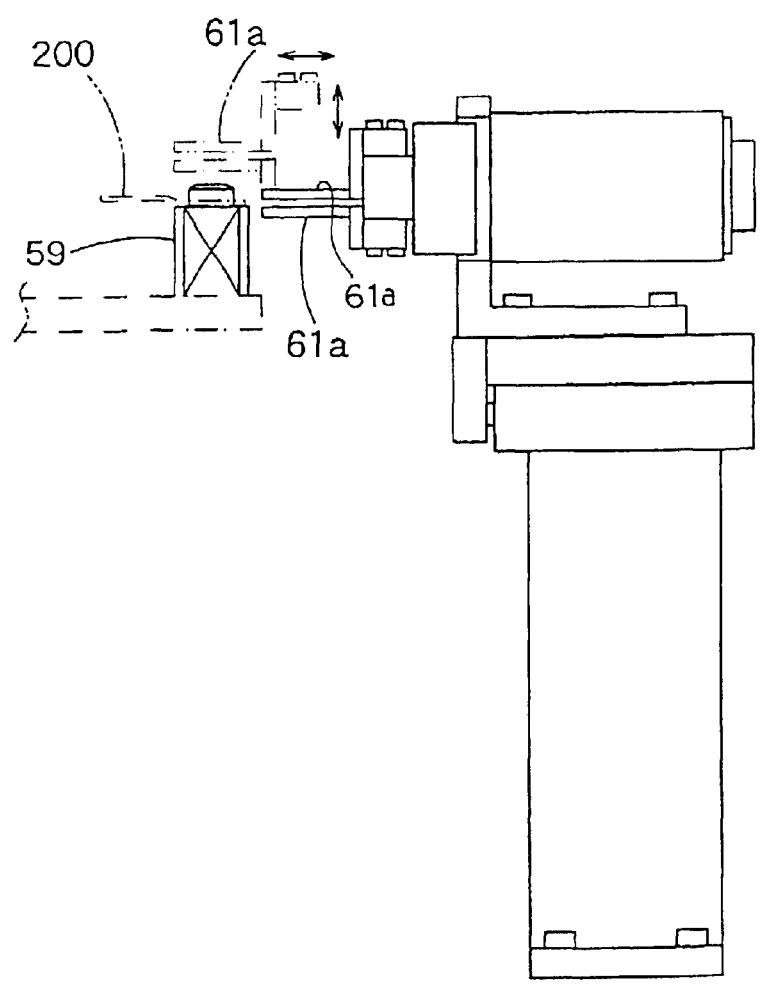
FIG. 8B is an elevation view of the second laminate turn over loading device of FIG. 8A.
Figure 9A:
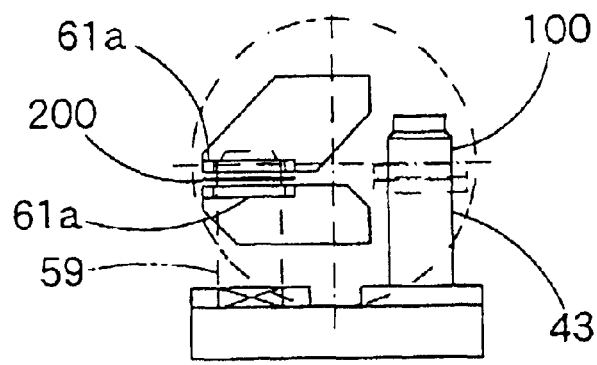
FIGS. 9A, 9B, and 9C are views showing sequential operations of the second laminate turn over loading device of FIG. 8A.
Figure 9B:
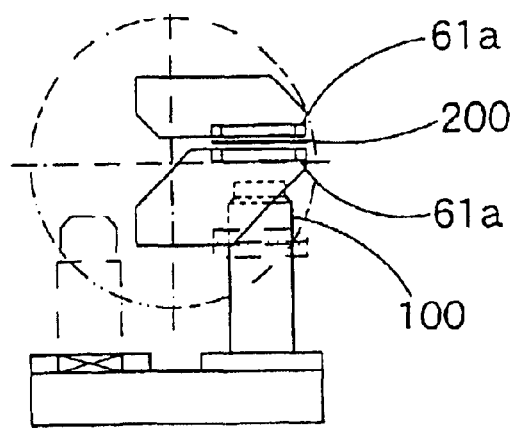
Figure 9C:
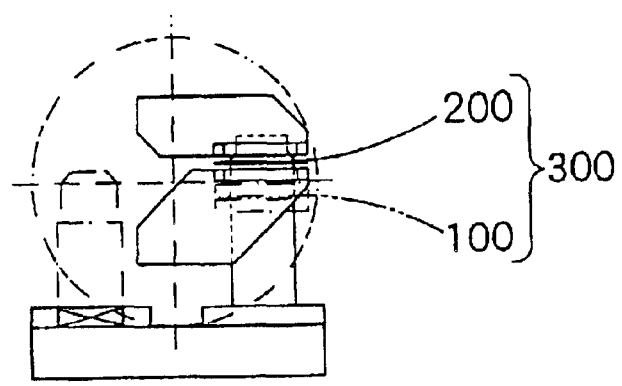

A second laminate turn over loading device 61 is operative to turn over upside down the second laminate 200 put on the auxiliary die 59 and put the second laminate 200 on the first laminate 100 in the die 43. The second laminate turn over loading device 61, as shown in FIGS. 8A and 8B, is provided with a pair of hands (upper and lower hands) 61a movable straight in forward and backward directions and in upward and downward directions. The hands 61a are positioned with 180° angular phase difference about an axis of a horizontal rotating shaft, rotatable clockwise or counterclockwise by 180° and movable to come close to or away from each other in a radial direction from the axis of the rotating shaft. An operation of transferring the second laminate 200 from the die 43 which is turned over on its way to the auxiliary die 59 is performed according to the processes as shown in FIGS. 9A, 9B and 9C. At first, the hands 61a, which are positioned away from each other, move forward to positions surrounding the second laminate 200 of the auxiliary die 59 and, then, hold the second laminate 200, while coming close to each other. Then, the hands 61a move upward to a predetermined height level and, while rotating clockwise by 180°, move to position the second laminate 200 right above the die 43. Further then, the hand 61a move downward to position the second laminate 200 above and adjacent the first laminate and, after the hands 61a come away from each other, the hands 61a move backward.

As mentioned above, the second laminate turn over loading operation serves to form an assembly body 300 composed of the cylindrical base 1, the first laminate 100 and the second laminate 200.

Figure 10:
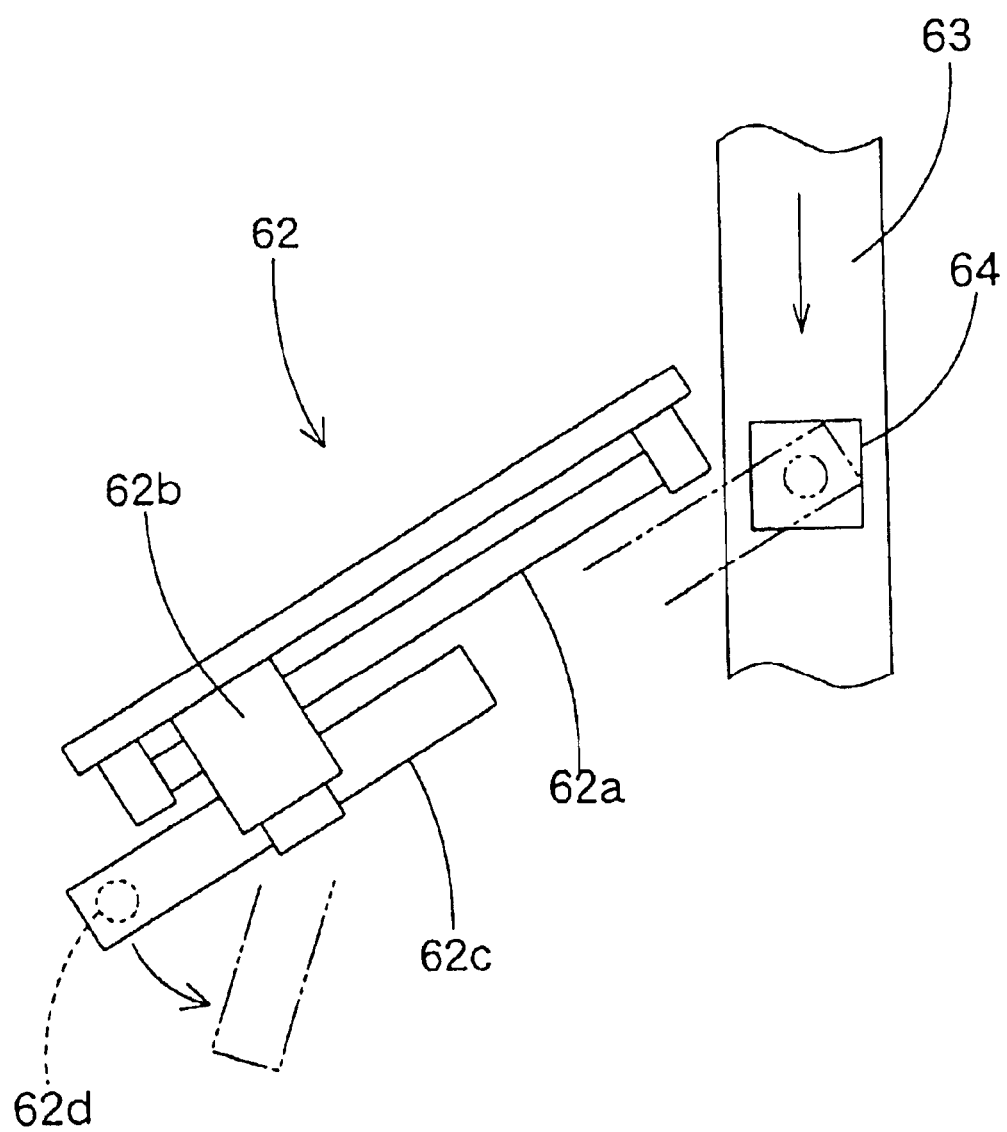
FIG. 10 is a plane view of an assembly body loading device.

In the assembly body take-out section 24, after the turn table 42 rotates by 180° in a state that the assembly body 300 is mounted on the die 43, an assembly body loading device 62 is operative to transfer the assembly body 300 from the die 43 to a pallet 64 on a belt conveyer 63. The assembly body loading device 62, as shown in FIG. 10, is provided with a first arm 62b movable in straight forward and backward along a guide rail 62a fixed thereto, a second arm 62c moving together with the first arm 62b and ratable clockwise or counterclockwise by 180° horizontally and a hand 62d movable in straight upward and downward on the second arm 62c. An operation of taking out the assembly body 300 is performed in such a manner that, after the hand 62d moves downward and holds the assembly body 300 on the die 43, the hand 62d rotates clockwise by 180° and the first arm 62b moves forward, then, the hand 62d moves downward and, after the assembly body 300 is mounted on the pallet 64, the hand 62d releases the holding of the assembly body 300, further then, the hand 62d moves upward and the first arm 62b moves backward, while the second arm 62c rotate counterclockwise by 180°.

Though an assembly body take out operation mentioned above, the assembly 300 is unloaded from the turn table 42 to the belt conveyer 63.

The assembly body 300 mounted on the belt conveyer 63 is transferred to a fastening stage at the second floor.

Figure 11A:
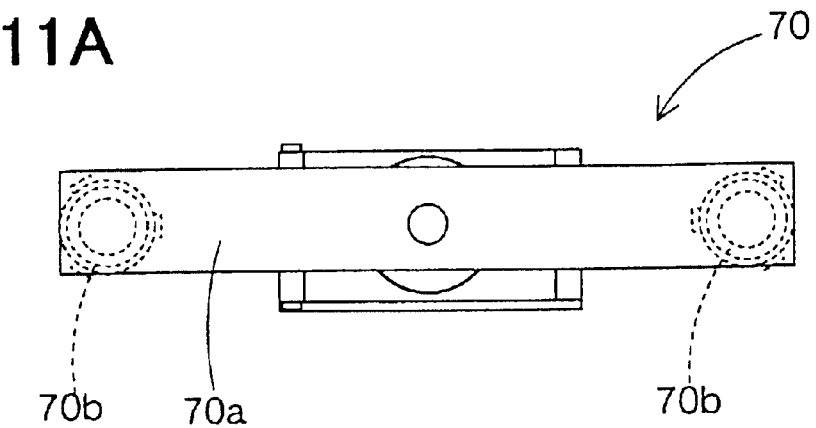
FIG. 11A is a plane view of a loader.
Figure 11B:
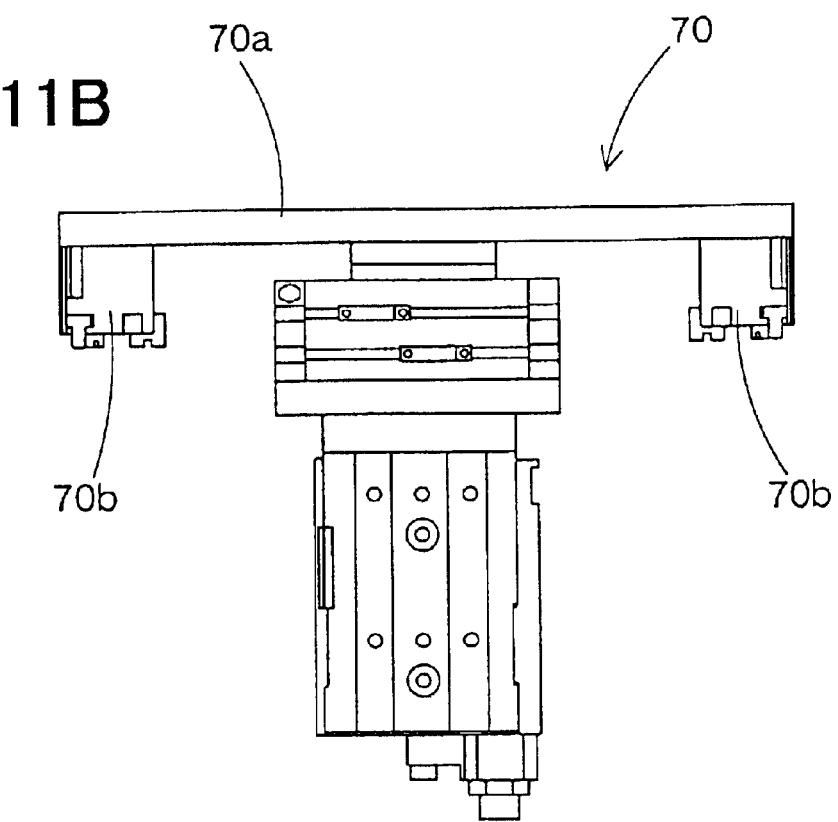
FIG. 11B is an elevation view of the loader of FIG. 11A.
Figure 12:
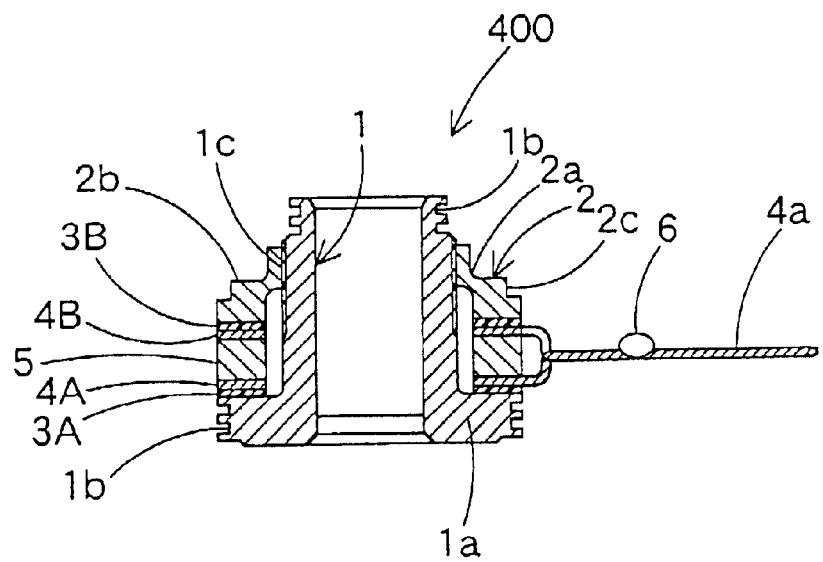
FIG. 12 is a sectional view of a sensor main body.

The fastening stage 11 has a nut supply unit 66 for supplying a nut 2, a fastening turn table 67, a fastening device 68 where the nut 2 is fastened to the assembly body 300 to form a sensor main body 400 having no resistor (refer to FIG. 12), and a loader 70 for transferring the assembly body 300 from a belt conveyer 69 to the fastening turn table 67 and transferring the sensor main body 68 on the fastening turn table 67 to the belt conveyer 69. The loader 70, as shown in FIGS. 11A and 11B, is provided with an arm 70a movable in straight upward and downward and hands 70b positioned on opposite end sides of the arm 70a. The hands 70b are operative to hold and (chuck) the assembly body 300 and the sensor main body 400 and release the holding of (un-chuck) the same.

In the fastening stage 11, the assembly body 300 carried by an elevator 65 to the second floor is transferred from the belt conveyer 69 to the fastening turn table 67. After the turn table 67 turns by ¼ rotation, the nut 2 supplied from the nut supply unit 66 is put on the assembly body 300 and, after the turn table 67 further turns by ¼ rotation, the nut 2 is fastened to the assembly body 300 by the fastening device 68 to form the sensor main body 400. Then, after the turn table further turns by ½ rotation, the sensor main body 400 is transferred from the turn table 67 to the belt conveyer 69 by the loader 70. The sensor main body 400 on the belt conveyer 69 is transferred to the bending stage 12 located next to the fastening stage 11.

The bending stage 12 is provided with a turn table 71 for bending, a bending device 72 where terminals 4a of the terminal plates 4A and 4B are bent and a loader 73 for transferring the sensor main body 400 on the belt conveyer 69 to the turn table 71 for bending and, after the bending work, transferring the sensor main body 400 from the turn table 71 to the belt conveyer 69. The loader 73 is constructed to be similar to the loader 70 mentioned above. At the bending station 12, the sensor main body 400 is transferred by the loader 73 from the belt conveyer 69 to the turn table 71. Then, the turn table 71 turns by ½ rotation and the terminals 4a of the terminal plates 4A and 4B are bent by the bending device 72. Further, after the turn table 71 turns by ½ rotation, the sensor main body 400 is transferred from the turn table 71 to the belt conveyer 69. The sensor main body 400 on the belt conveyer 69 is transferred to the welding stage 13 located next to the bending stage 12.

The welding stage 13 is provided with a resistor supply unit 74 for supplying resistors 6, a turn table 75 for welding, a welding device in which the resistor 6 is spot welded between the terminals 4a of the terminal plates 4A and 4B of the sensor main body 400, and a loader 77 for transferring the sensor main body 400 on the belt conveyer 69 to the turn table 75 for welding and the sensor main body 400 on the turn table 75 to the belt conveyer 69. The loader 77 is constructed to be similar to the loader 70 mentioned above. At the welding station 13, the sensor main body 400 is transferred by the loader 77 from the belt conveyer 69 to the turn table 75. Then, the turn table 75 turns by ½ rotation and the resistor 6 supplied from the resistor supply unit 74 is spot welded between the terminals 4a of the terminal plates 4A and 4B by the welding device 76. Further, after the turn table 75 turns by ½ rotation, the sensor main body 400 is transferred from the turn table 75 to the belt conveyer 69. The sensor main body 400 on the belt conveyer 69 is transferred to the resin molding stage 14 at the first floor.

Figure 13:
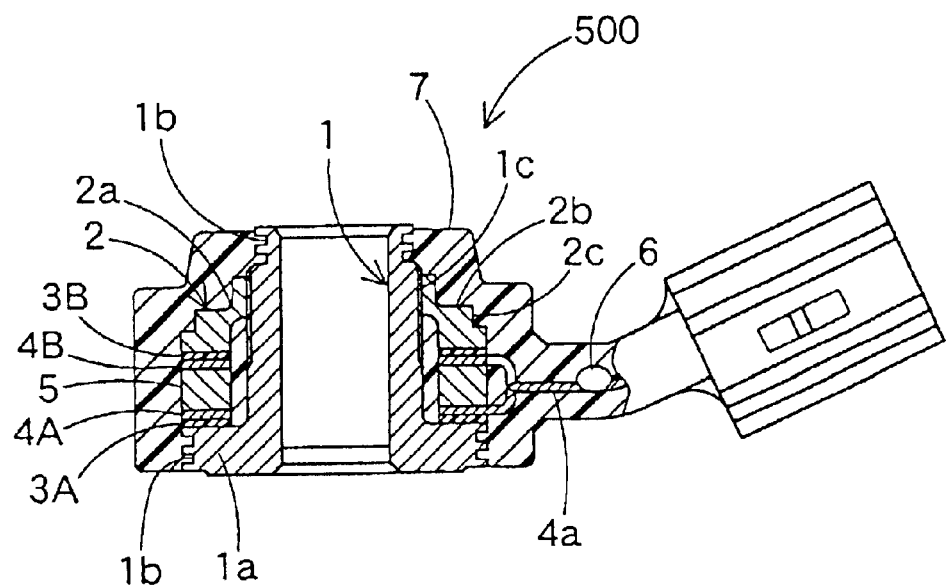
FIG. 13 is a sectional view of a non-resonance knock sensor.
Figure 14:
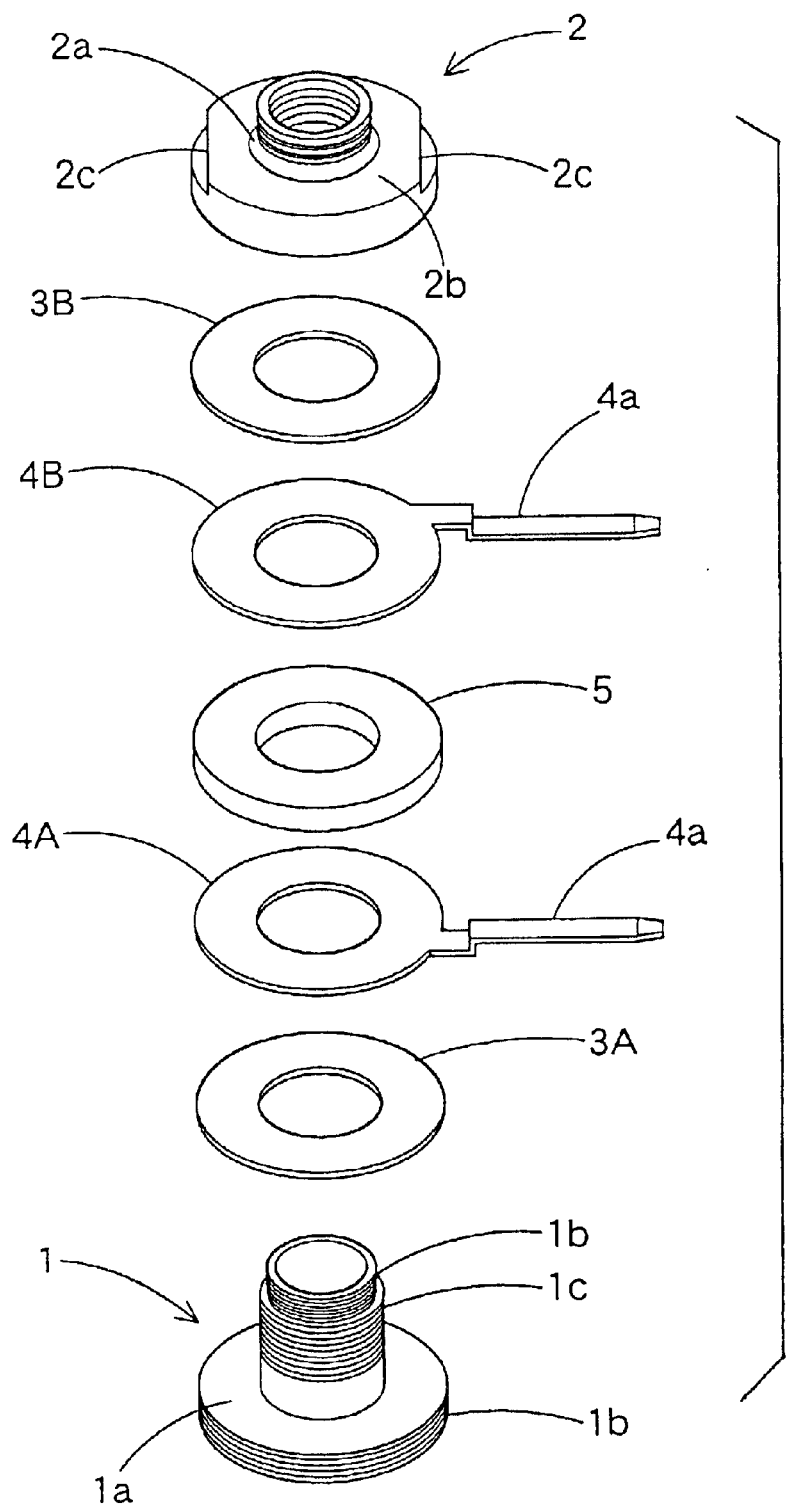
FIG. 14 is an exploded perspective view of the non-resonance knock sensor of FIG. 13.
Figure 15:
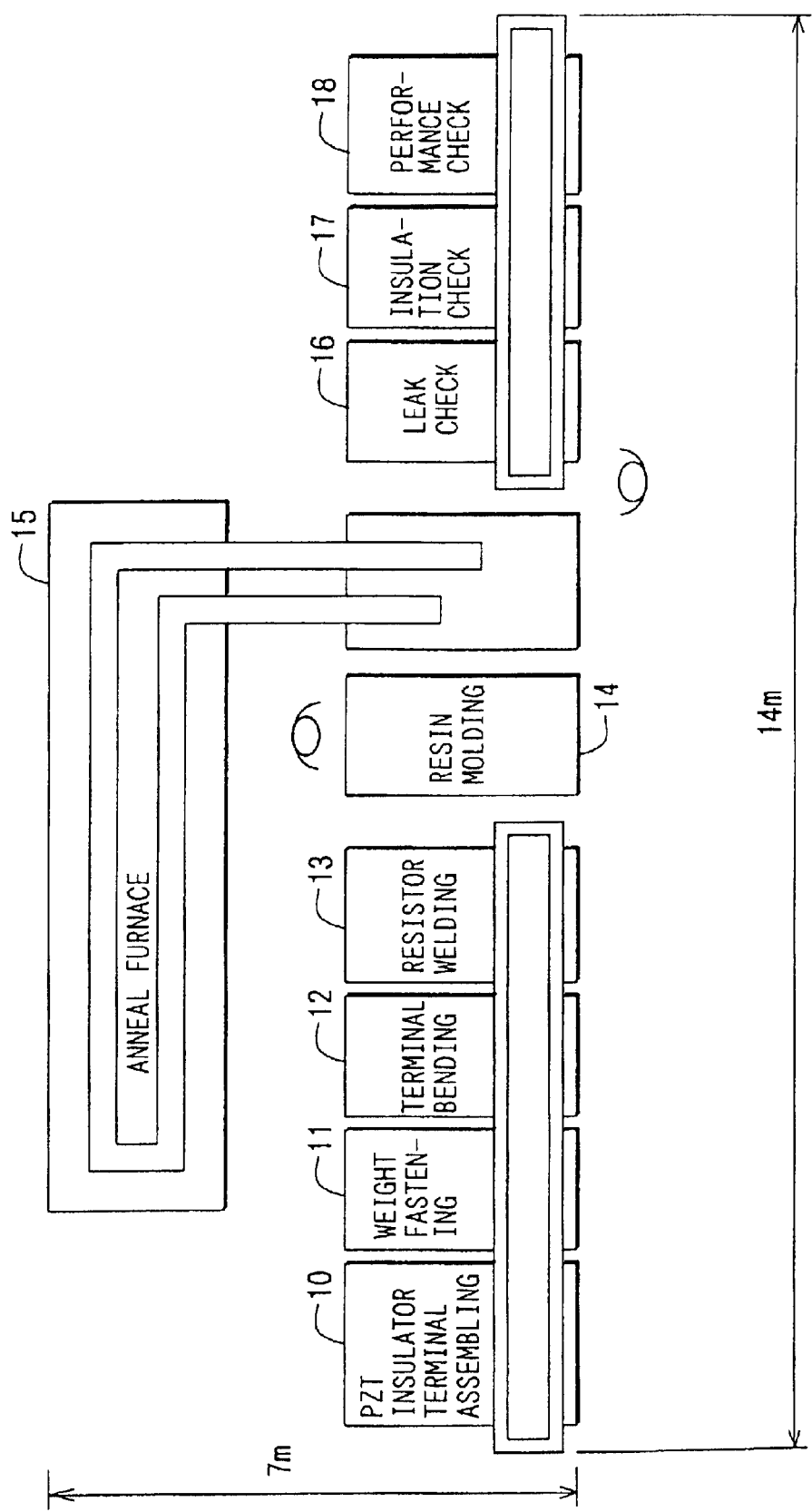
FIG. 15 is a plane view showing a conventional manufacturing line.
Figure 16:
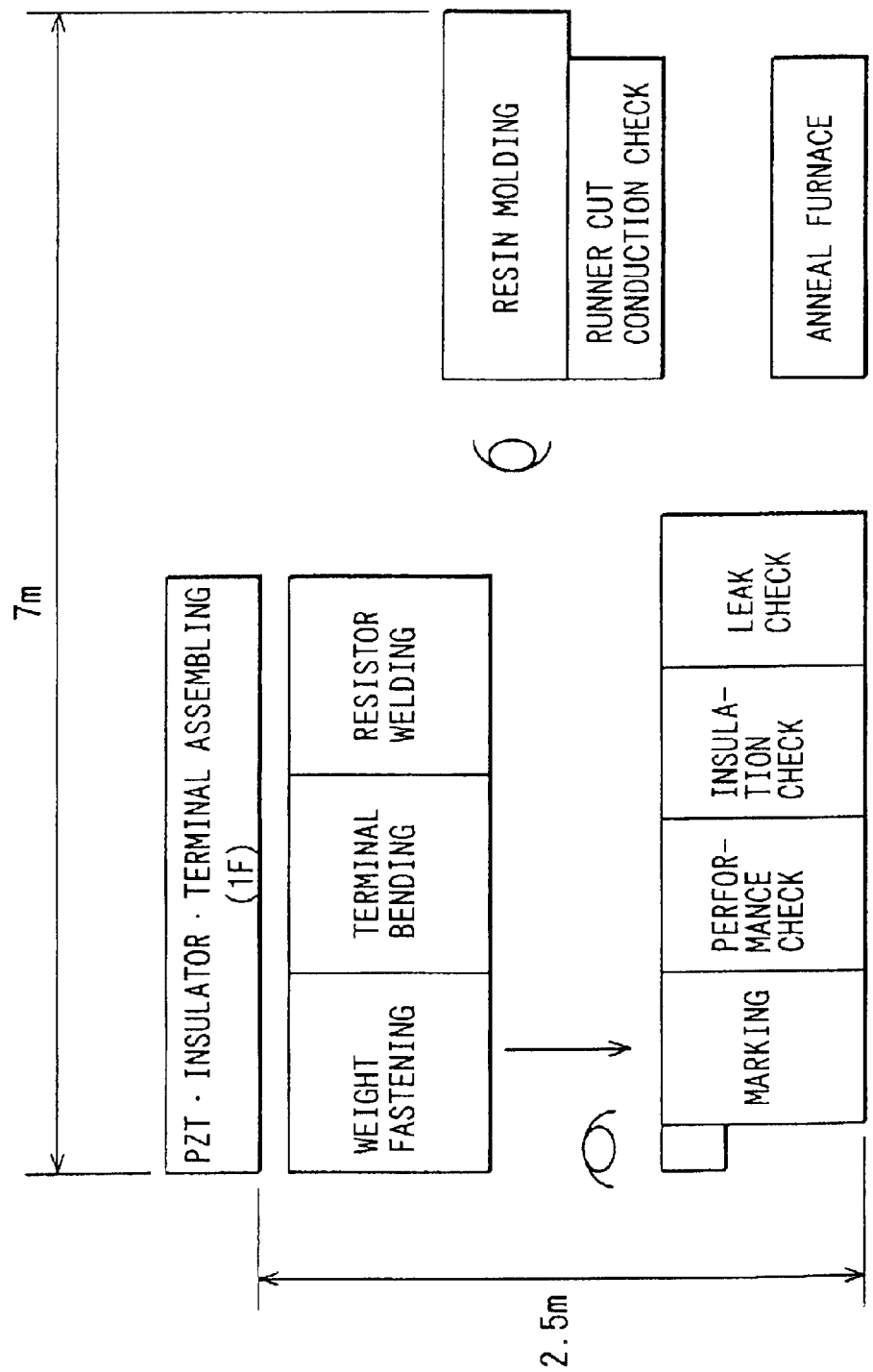
FIG. 16 is a plane view showing a manufacturing line according to the embodiment of the present invention.

At the resin molding stage 14, the sensor main body 400 is insert molded by mold resin 7 so that a non-resonance knock sensor (refer to FIG. 13) is formed.

The non-resonance knock sensor 500 taken out from the resin molding stage 14 is annealed in an anneal furnace 15. The anneal furnace 15 is a belt conveyer furnace in use of infrared rays (including). Annealing time at the anneal furnace 15 is, typically, 3 to 5 minutes, which is extremely short, compared with the annealing time, for example, 150° C. ×3 hours, of the conventional high temperature anneal furnace. Further, the belt conveyer furnace in use of infrared rays is more compact, compared with the conventional high temperature anneal furnace, since the resin absorbs the infrared rays in the anneal furnace in use of infrared rays.

The non-resonance knock sensor 500 that has been annealed is transferred by a belt conveyer 78 and a leak check at a leak check stage 16, an insulation check at an insulation check stage 17 and performance check at a performance check stage 18 are conducted, respectively. Loaders 79, 80 and 81, each of which is similar to the loader 70, are operative to transfer the non-resonance knock sensor 500 between the belt conveyer 78 and the respective check stations 16, 17 and 18. The leak check, the insulation check and the performance check are conducted by a well known method, so detail explanations thereof are omitted.

As described above, in the method and apparatus of manufacturing the non-resonance knock sensor according to the preferred embodiment, the assembly operation of the assembly body 300 in which the lower insulator 3A, the lower terminal plate 4A and the piezoelectric element 5, the upper terminal plate 4B and upper insulator 3B are inserted into the cylindrical base 1 are executed at the first floor. The fastening operation of fastening the nut 2 to the assembly body 300 to form the sensor main body 400, the bending operation of bending the terminals 4a of the upper and lower terminal plates 4A and 4B of the sensor main body, and the welding operation of connecting by welding between the terminals 4a that have been bent are executed sequentially at the second floor. Since a space positioned vertically above the ground is used for the second floor, a horizontal ground area necessary for the manufacturing line is smaller.

The lower and upper insulators 3A and 3B are the same kind of insulators 3(identical) and the lower and upper terminal plates 4A and 4B are also same kind of terminal plates 4 (identical). The assembly operation is composed of an auxiliary assembly operation of assembling the first laminate 100 having the lower insulator 3A, the lower terminal plate 4A and the piezoelectric element which are piled up on top of one another and the second laminate 200 having the upper insulator 3B and the upper terminal plate 4B which are stacked with each other, the first assembly operation of amounting the first laminate 100 on the cylindrical base 1, the second assembly operation of mounting the second laminate upside down on the first laminate mounted on the cylindrical base 1. The auxiliary assembly operation is executed during a period when the first and second assembly operations are executed so that a total time for forming the assembly body 300 is smaller.

The first and second assembly operation are executed in a state that the cylindrical base 1 is mounted on the turn table 42 for assembly. Accordingly, a space necessary for installing the first and second assembly equipment is smaller.

Further, the fastening operation is executed in a state that the assembly body 300 is mounted on the turn table 67 for assembly. Accordingly, a space necessary for installing the fastening equipment is smaller.

The bending operation is executed in a state that the sensor main body 400 is mounted on the turn table 71 for bending. Accordingly, a space necessary for installing the bending equipment is smaller.

Furthermore, the welding operation is executed in a state that the sensor main body 400 whose terminals 4a are bent is mounted on the turn table 75 for welding. Accordingly, a space necessary for installing the welding equipment is smaller.

Moreover, after the welding operation, the resin mold operation, annealing operation and check operations are sequentially executed. In particular, annealing operation is executed by the anneal furnace 15 in use of infrared rays (including far infrared rays) so that a time for annealing is shorter and a space for installing the anneal furnace is smaller.

The check operations are operated in use of the loaders 79, 80 and 81 so that the check stations are compact and their cost is lower.

As mentioned above, a horizontal ground area necessary for installing the manufacturing line according to the present invention is remarkably lower.

What is claimed is:

1. A two-story apparatus for manufacturing a non-resonance knock sensor having a cylindrical base, a lower insulator, a lower terminal plate, a piezoelectric element, an upper terminal plate, an upper insulator, a nut and a resistor which are covered with resin, comprising:

an assembly body stage positioned at a first floor for forming an assembly body in which the lower insulator, the lower terminal plate, the piezoelectric element, the upper terminal plate and the upper insulator are mounted on the cylindrical base;

process stages positioned at a second floor for fastening the assembly body with the nut to form a sensor main body, bending partly the lower and upper terminal plates of the sensor main body and connecting by welding the resistor between the lower and upper terminal plates which are partly bent in the sensor main body; and an elevator for transferring the assembly body from the first floor to the second floor so that the assembly body stage at the first floor and the process stages at the second floor are integrated, wherein each of the lower and upper insulators is identical and each of the lower and upper terminal plates is identical, and, further, wherein the assembly body stage comprises a first laminate forming device of assembling a first laminate in which the lower insulator, the lower terminal plate and the piezoelectric element are sequentially piled up on top of one another, a second laminate forming device of assembling a second laminate in which the upper insulator and the upper terminal plate are sequentially piled up, a first assembly device of mounting the first laminate on the cylindrical base, and a second assembly of mounting the second laminate on upside down on the first laminate mounted on the cylindrical base to form the assembly body.

2. The apparatus according to claim 1, wherein the first and second assembly devices have an assembly turn table commonly usable therefore on which the cylindrical base is mounted.

3. A two-story apparatus for manufacturing a non-resonance knock sensor having a cylindrical base, a lower insulator, a lower terminal plate, a piezoelectric element, an upper terminal plate, an upper insulator, a nut and a resistor which are covered with resin, comprising:

an assembly body stage positioned at a first floor for forming an assembly body in which the lower insulator, the lower terminal plate, the piezoelectric element, the upper terminal plate and the upper insulator are mounted on the cylindrical base;

process stages positioned at a second floor for fastening the assembly body with the nut to form a sensor main body, bending partly the lower and upper terminal plates of the sensor main body and connecting by welding the resistor between the lower and upper terminal plates which are partly bent in the sensor main body;

an elevator for transferring the assembly body from the first floor to the second floor so that the assembly body stage at the first floor and the process stages at the second floor are integrated;

a resin molding device for molding with the resin the sensor main body having the resistor connected between the upper and lower terminal plate by welding to form the non-resonance sensor;

a belt conveyer type anneal furnace for annealing the non-resonance sensor in use of infrared rays including far infrared rays; and check stations for checking leak, insulation and performance of the non-resonance knock sensor.

4. The apparatus according to claim 3, further comprising:
a conveyer for transferring the non-resonance knock sensor among the check stations, and
a loader provided at each of the check stations for loading and unloading each of the check stations with the non-resonance knock sensor on the conveyer.

5. A two-story apparatus for manufacturing a non-resonance knock sensor having a cylindrical base, a lower insulator, a lower terminal plate, a piezoelectric element, an upper terminal plate, an upper insulator, a nut and a resistor which are covered with resin, comprising:

an assembly body stage positioned at a first floor for forming an assembly body in which the lower insulator, the lower terminal plate, the piezoelectric element, the upper terminal plate and the upper insulator are mounted on the cylindrical base;

process stages positioned at a second floor for fastening the assembly body with the nut to form a sensor main body, bending partly the lower and upper terminal plates of the sensor main body and connecting by welding the resistor between the lower and upper terminal plates which are partly bent in the sensor main body; and an elevator for transferring the assembly body from the first floor to the second floor so that the assembly body stage at the first floor and the process stages at the second floor are integrated, wherein the process stages have a bending turn table to be used for bending partly the lower and upper terminal plates in a state that the sensor main body is mounted thereon.

6. A two-story apparatus for manufacturing a non-resonance knock sensor having a cylindrical base, a lower insulator, a lower terminal plate, a piezoelectric element, an upper terminal plate, an upper insulator, a nut and a resistor which are covered with resin, comprising:

an assembly body stage positioned at a first floor for forming an assembly body in which the lower insulator, the lower terminal plate, the piezoelectric element, the upper terminal plate and the upper insulator are mounted on the cylindrical base;

process stages positioned at a second floor for fastening the assembly body with the nut to form a sensor main body, bending partly the lower and upper terminal plates of the sensor main body and connecting by welding the resistor between the lower and upper terminal plates which are partly bent in the sensor main body; and an elevator for transferring the assembly body from the first floor to the second floor so that the assembly body stage at the first floor and the process stages at the second floor are integrated, wherein the process stages have a bending turn table to be used for connecting by welding the resistor between the lower and upper terminal plates which are partly bent in a state that the sensor main body is mounted thereon.

7. A two-story apparatus for manufacturing a non-resonance knock sensor having a cylindrical base, a lower insulator, a lower terminal plate, a piezoelectric element, an upper terminal plate, an upper insulator, a nut and a resistor which are covered with resin, comprising:

an assembly body stage positioned at a first floor for forming an assembly body in which the lower insulator, the lower terminal plate, the piezoelectric element, the upper terminal plate and the upper insulator are mounted on the cylindrical base;

process stages positioned at a second floor for fastening the assembly body with the nut to form a sensor main body, bending partly the lower and upper terminal plates of the sensor main body and connecting by welding the resistor between the lower and upper terminal plates which are partly bent in the sensor main body; and an elevator for transferring the assembly body from the first floor to the second floor so that the assembly body stage at the first floor and the process stages at the second floor are integrated, wherein the process stages have a fastening turn table to be used for mounting the nut on the assembly body and fastening the nut to the cylindrical base of the assembly body to form the sensor main body, both in a state that the assembly body is mounted thereon.

* * * * *